United States Patent [19]
Buican et al.

[11] Patent Number: 5,364,744
[45] Date of Patent: Nov. 15, 1994

[54] METHOD FOR THE MANUFACTURE OF AN OPTICAL MANIPULATION CHAMBER

[75] Inventors: Tudor N. Buican; Kevin M. Carlson, both of Albuquerque, N. Mex.

[73] Assignee: Cell Robotics, Inc., Albuquerque, N. Mex.

[21] Appl. No.: 919,183

[22] Filed: Jul. 23, 1992

[51] Int. Cl.⁵ .............................................. B29C 35/08
[52] U.S. Cl. ...................................... 430/321; 430/945; 430/328; 356/244; 427/510; 264/22; 422/58
[58] Field of Search ....................... 430/321, 328, 945; 422/58; 356/244; 264/22; 427/508, 510

[56] References Cited

U.S. PATENT DOCUMENTS

| | | | |
|---|---|---|---|
| 4,231,660 | 11/1980 | Remy et al. | 356/244 |
| 4,961,886 | 10/1990 | Eckstein | 264/22 |
| 5,100,627 | 3/1992 | Buican et al. | 422/108 |
| 5,135,379 | 8/1992 | Fudim | 425/174.4 |
| 5,151,813 | 9/1992 | Yamamoto et al. | 264/22 |

OTHER PUBLICATIONS

Optical Trapping, Cell Manipulation & Robotics, Buican et al, SPIE, vol. 1063, New Tech in Cytometry, 1989.
Optical Trapping of Small Particles Using a 1.3 μm Compact in GaAsP diode laser, Sato et al, Optics Letters, vol. 16 No. 5, Mar. 1, 1991.
Optical Tweezers in Cell Biology, Kuo et al, Trends in Cell Biology, vol. 2 Apr. 1992.

*Primary Examiner*—Charles L. Bowers, Jr.
*Assistant Examiner*—John A. McPherson
*Attorney, Agent, or Firm*—Sheldon H. Parker

[57] ABSTRACT

A chamber is disclosed, as for example an optical manipulation chamber, which has a pair of spaced windows and a central core member between the windows. The windows are aligned in parallel planes and the central core member contains a plurality of compartments and channels. A radiation curable resin is used, in combination with injection ports, to form the channels and compartments. The configuration of the channels and compartments is placed on a mask having shielding and nonshielding regions. Radiation is passed through the mask as the resin is injected through the ports, thereby curing the resin which is exposed to the radiation. The channels and compartments can be accurately designed in minute detail.

27 Claims, 4 Drawing Sheets

METHOD FOR THE MANUFACTURE OF AN OPTICAL MANIPULATION CHAMBER

FIELD OF THE INVENTION

This invention relates to a manipulation chamber for use in a device which manipulates biological cells or other minute particles, through the use of a laser beam, and to its method of manufacture.

BACKGROUND OF THE INVENTION

Optical trapping is an established technique for the levitating, positioning and transporting of microscopic particles. The technique employs pressure exerted by one or several laser beams. Particles that can be manipulated by optical trapping include biological cells and cell constituents, such as chromosomes. Optical trapping is particularly important in applications such as the creation of hybrid cell lines, the separation of rare cells such as fetal cells in maternal blood, and the separation of chromosomes and chromosome fragments.

In order for optical trapping to achieve its full potential as a technique for the manipulation of biological particles, manipulation chambers are required that satisfy the following requirements:

a) they must be fully enclosed and have ports through which particle suspensions, culture media, and reagents can be introduced;

b) they must have good optical quality windows through which the particles can be illuminated and observed with a microscope, and through which the laser trapping beam or beams can be introduced;

c) they must have one or more small sized compartments, in which the particles can be introduced, separated, and processed, as well as channels connecting these compartments with each other and with the external ports;

d) they must have large surface area and small thickness in order to facilitate heat exchange for the purpose of temperature control, small thickness to allow the use of concentrated suspensions, since the surface density of the particles settled onto the bottom window is kept low as a consequence of the small settling volume; and e) they can contain in-built electrical conductors required in certain processes such as electroporation and electrofusion.

The configuration of the chamber and its functions are disclosed in U.S. Pat. No. 5,100,627 and in *Optical Trapping, Cell Manipulation, and Robotics*, Buican, T. N., Neagley, D. L., Morrison, W. C. and Upham, B. D., SPIE Proceedings, vol. 1063, 1989, the subject matter of which is incorporated herein by reference as though recited herein in full. It has been disclosed in U.S. Pat. No. 5,100,627 that an optical trap of the type of the instant invention, can be provided with an optical manipulation chamber which consists of three layers. The two outer layers are two closely spaced windows lying in parallel planes. The two windows are of good optical quality. The three layers are glued together, as for example with a UV curable adhesive. It is also disclosed that the optical manipulation chamber is an essential part of the optical trapping instrument and that the characteristics of the chamber determine to a large extent the range of biological applications of the instrument.

The central section contains microscopic compartments and interconnecting channels. In accordance with the prior art the channels are either laser machined into thin, 120 $\mu$m stainless steel stock, or photoetched into a photosensitive ceramic, such as the special ceramic, sold under the name Fotoceram, produced by the Corning corporation. A design of the ceramic center section is shown in FIGS. 2 and 3 of U.S. Pat. No. 5,100,627. One of the windows is a 170 $\mu$m thick glass coverslip, while the other window is a 1 mm thick glass slide with holes in which the external ports are mounted. The thin window lies on the imaging side. The thick window also plays a structural role by supporting the external ports and giving rigidity to the chamber. The sandwich design provides chambers with complex internal structures and with uniform overall shape. The design also maximizes heat transfer between the chamber and its holder, thus allowing accurate temperature control and, if required, fast temperature changes. The multiple compartments of the chamber and the interconnecting channels provide a mechanism by which complex experiments can be performed. The channels are on the order of 100 microns and the order of about 500 microns. The compartments are the microscopic equivalent of test tubes between which the instrument can transfer cells and other biological particles. Furthermore, the channels connecting the compartments with the external ports allow the composition of the suspension medium in the compartments to be modified at will. Some of the compartments can be filled with air, thus isolating the main compartments of the chamber from each other. While this systems performs well, the production of the central layer represents a substantial expense, since the laser etching and photoetching processes are costly and result in a high cost for the chambers.

SUMMARY OF THE INVENTION

Whereas the laser etching and photoetching processes are costly, resulting in a high cost for the chambers, the photopolymerization process of the instant invention is relatively inexpensive and highly reproducible. The photomasks of the instant invention are reusable over an extended period of time, thus resulting in a low per unit cost and a low final cost for the chambers of the instant invention.

The optical manipulation chamber has a pair of spaced windows and a central core member between the windows. The windows lie in parallel planes and the central core member contains a plurality of compartments and channels. In one embodiment, the method of manufacture involves initially placing a radiation mask between one of the windows and a source of polymerizing radiation. The mask has radiation shielding regions and non-shielding regions. The non-shielding regions are in a pattern corresponding to the desired pattern of the plurality of compartments and channels which are to be produced. A radiation curable resin is fed into the space between the two windows. Radiation, such as UV radiation or a scanned laser beam is applied from the source of radiation to the radiation curable resin while the resin is being pumped into the space between the two windows, causing the radiation curable resin to at least partially cure and to prevent uncured resin from being pumped into the non-shielded regions. The radiation mask is removed from its position between the one of the windows and the source of polymerizing radiation and then all of the radiation curable resin is exposed to the polymerization radiation until all of the radiation curable resin is cured.

BRIEF DESCRIPTION OF THE DRAWINGS

The objects of the invention will become apparent and the invention will be more fully understood when read in combination the following drawings wherein.

DESCRIPTION OF THE PREFERRED EMBODIMENTS

Figure 1:
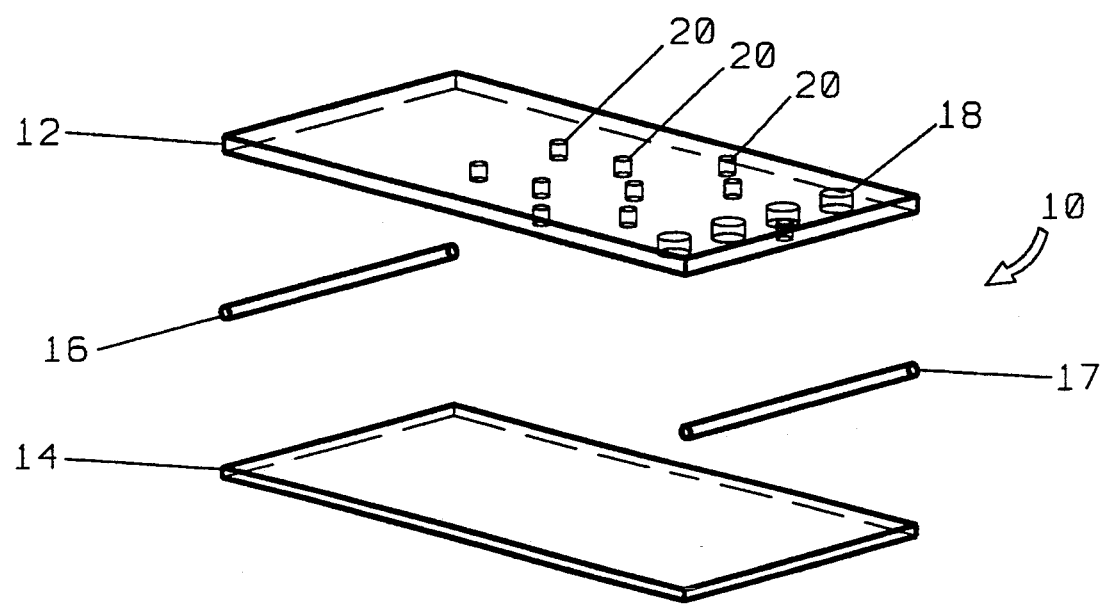
FIG. 1, is an exploded illustration of a blank chamber, in accordance with the present invention.

U.S. Pat. No. 4,961,886, issued Oct. 9, 1990 to Dow Corning Corporation, the disclosure of which is incorporated herein by reference as though recited herein in full, discloses a method of limiting the flow of a radiation curable material on a substrate. The disclosure of radiation curable materials and radiation curing equipment in particular is noted. The patent discloses the focusing of radiation on a patterned area of a substrate to cause a dam of cured material to form thereby limiting the further flow of radiation curable material. The substrates are disclosed as including such materials as thermoset, glass, metal, and ceramic materials. The invention is applied to the coating or encapsulation of printed circuit boards plastic pin grid arrays, tape automated bonding devices, and the encapsulation of devices which contain holes which are to remain free of material. By way of contrast the instant invention is directed to the formation of minute devices which contain enclosed, essentially tubular passageways or channels, which can be less than 100 microns wide, as compared to the dams of the Dow patent which have no dimensional criticality. Further contrast is seen in that the instant invention creates a three layer structure having a pair of substrate-like members, at least one of which must be transparent to the resin curing radiation. Thus, whereas the prior art recognizes the equivalent utility of using various opaque materials and glass, as the substrate, no such equivalency exists in the instant invention since at least one substrate must be transparent to the resin curing radiation.

Another distinction can be characterized as the formation of three dimensional structures as compared to the prior art coating or encapsulating on a single substrate. That is, in the instant invention all three dimensions are essential to the final structure, whereas a two dimensional representation or top view of the structure of the Dow patent reveals the critical features of the structure, in the instant invention a side view is also required to see the essential features of the novel structure which is formed. A further aspect of contrast with the prior art is seen in that the Dow system relies on material flow characteristics to coat a substrate, whereas the instant invention relies on capillary flow and surface tension acting on the advancing front. Thus, in the instant invention the wetting of the upper and lower substrates results in the formation of two opposed concave walls separated by a clear stretch of window. If the two walls were to touch each other at any point, the channel would collapse because of the surface tension affect. Viewed from another aspect, the prior art systems are coating or encapsulation processes, whereas the instant invention is an enclosed channel formation process.

Photopolymerization is employed in the present invention to create a pattern of channels and compartments inside of a blank chamber. A specific illumination pattern is used to generate the channels and compartments.

The blank chamber, indicated generally in the exploded view of FIG. 1, as element 10, included three primary components. An upper window 12, a pair of spacers 16 and 17 and a lower window 14. In one embodiment, the top window is manufactured out of a plastic material. The upper window is provided with a plurality of chamber ports 18. The chamber ports 18 allow fluids to be circulated through the chamber during its normal use. A plurality of injection ports 20, are used for the injection of the photocurable resin during the manufacturing process.

Typically, hypodermic stainless steel tubing, (not shown), of appropriate diameter is fitted into the chamber ports and is cemented in place. Flexible plastic tubing can then be used to connect the chamber to a fluidic system that controls the circulation of fluids, such as particle suspensions, culture media, and reagents, through the chamber compartments.

The upper window 12, is formed of glass or plastic, such as a 1 mm thick microscope slide. The lower glass window can be formed of a glass material such as a 170 $\mu$m thick microscope coverslip. The spacers 16 and 17 are formed of a material of well controlled thickness, such as wire or steel shim stock to provide a spacing on the order of about 80 microns.

In one implementation, the open sides of the chamber are sealed with a high viscosity, fast curing epoxy resin. A UV curable epoxy can, advantageously, be used.

Figure 2:
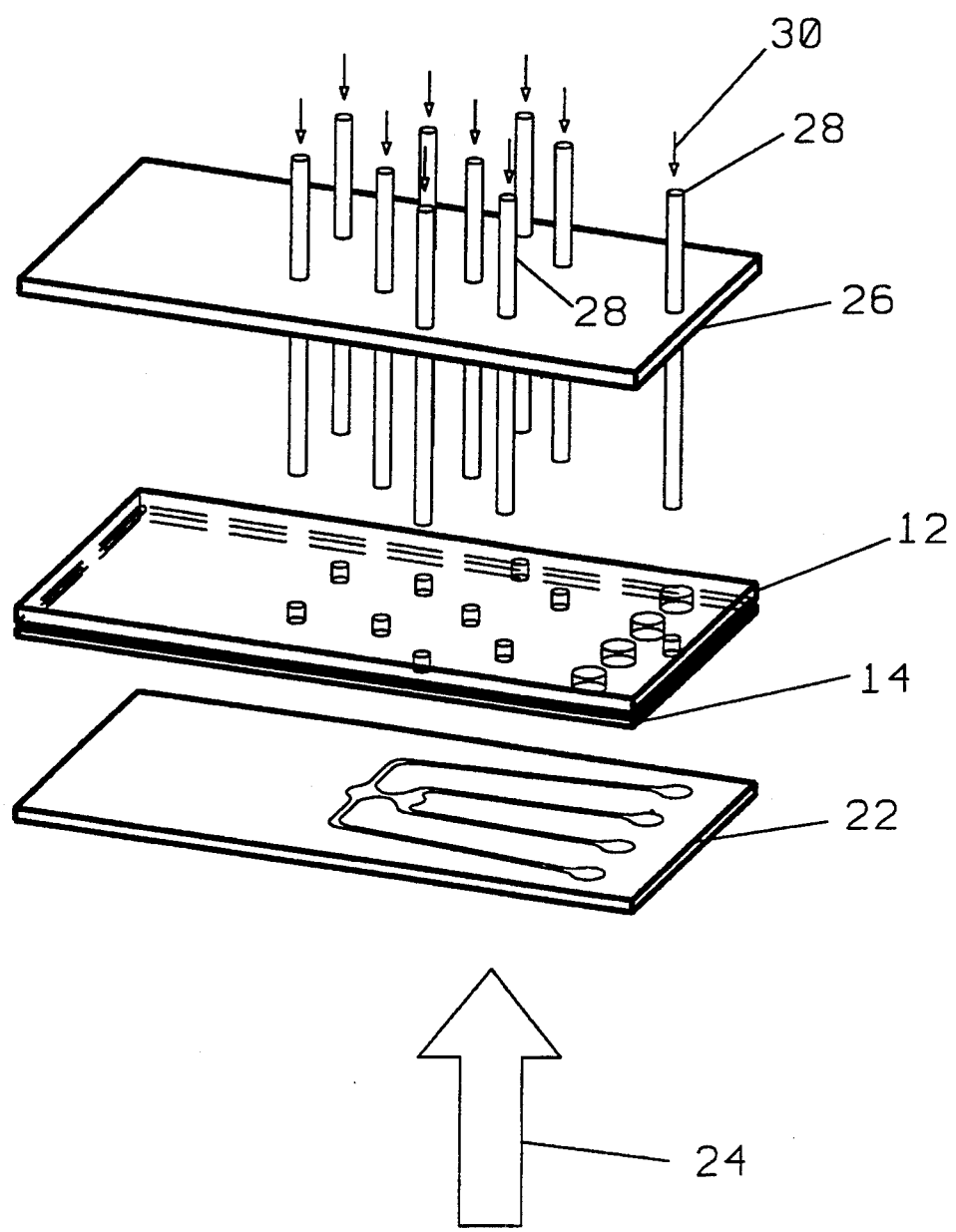
FIG. 2 is a view of the chamber and the opaque mask.

As shown in FIG. 2, the blank chamber and the mask are stacked together. The mask 22, is opaque, except for areas which correspond to the desired pattern of compartments and channels. A collimated UV beam 24, of appropriate cross-section and intensity is used to illuminate the mask. A UV field is produced within the blank chamber that follows the compartment and channel pattern. One or more tubes 28, of appropriate diameter are inserted into the injection ports 20. An injection figure or jig 26 can be used to support the injection tubes 28. A photocurable resin 30 with suitable properties of wetting characteristics, viscosity and curing time, is injected through the injection ports 20, into the space between the upper window 12 and the lower window 14. The photocurable material is preferably, a UV curable resin, as well known in the art. The injection can be performed successively through the injection ports, or simultaneously through all of the injection ports 20. Obviously, the simultaneous injection of resin through all of the injection ports requires less time for filling the chamber with resin, than is required for the successive use of injection ports 20.

Figure 3:
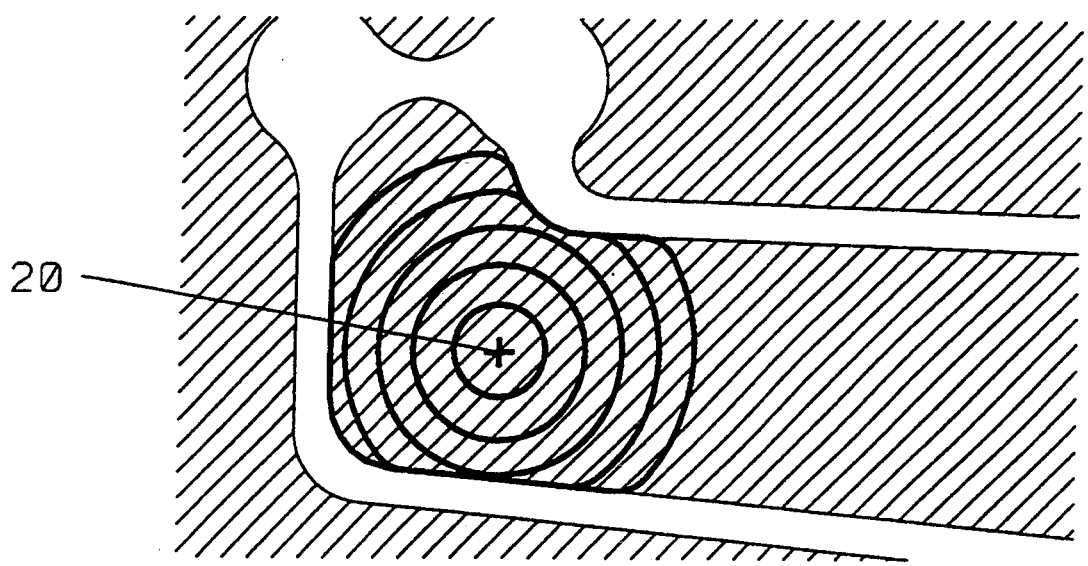
FIG. 3 the resin flows from the injection port.

As shown in FIG. 3, the resin flows from the injection port 20, in an outwardly increasing circular pattern. The viscosity, curing time and wetting properties of the resin, as well as the intensity of the UV illumination field, the size of the openings in the mask, and the injection rate, are properly selected, such that the liquid resin advances until it reaches regions of high UV intensity at the edge of the desired channels and compartments. In the regions of high UV intensity the resin begins to cure, its viscosity increases, and the flow is stopped. A relatively smooth, meniscus-shaped wall forms that follows the outline of the desired compartments and channels. The resin is thereby precluded from coming into contact with the windows in the open areas thus preserving the critical optical quality of the windows. It is in this respect that the present invention differs from the UV curing system used to produce printed circuit boards. While the present system is somewhat related to the aforenoted process, it is a reversal of the printed circuit board system in that with respect to the printed circuit boards, the UV curable resin is permitted to flow across the entire surface of the board, and then through the use of a mask, exposed regions are caused to cure and masked regions remain uncured. The uncured region is washed away with a solvent leaving the desired pattern of cured resin. The enclosed characteristic of the blank chamber in combination with the small dimensions involved, render the use of the conventional UV cure and remove system of the printed circuit board art, inapplicable to the present invention. Even more critical is the fact that in the circuit board process, all surfaces are coated with the UV curable resin. By way of contrast, the present system protects the open window areas from coming in contact with resin, thus preserving and protecting the optical quality of the open, that is, uncovered areas of the windows.

The mask is then removed and the entire chamber is exposed to the UV radiation. The result is the complete curing of the resin and the production of a thin chamber with well defined, open compartments and channels. Alternatively, the complete curing of the resin can be achieved by applying further radiation The radiation used to cure the polymer can be in accordance with the well known techniques in the art, as for example, gamma radiation. The major restrictions are cost and the ability to accurately shield the non-channel and non-compartment areas from the radiation. Heat curing is also not feasible because of the inability to shield areas and to produce a sharp demarcation between shielded and unshielded regions.

Figure 4:
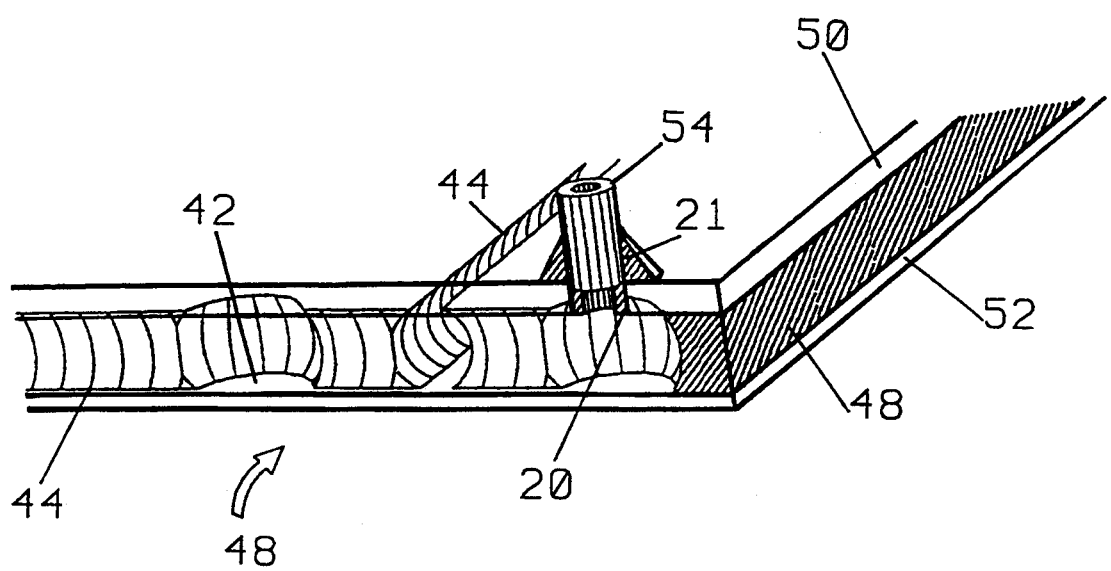
FIG. 4 is a perspective, fragmentary cross-sectional view of a formed chamber, showing channels and compartments.

The formed chamber is indicated generally in FIG. 4, as 40. The resin initially enters the space between the upper window 50 and the lower window 52 through and inlet port 46. The resin flows to the chamber through injection port 18. The injection tubing fits loosely in the injection ports 20. The injection ports work as little wells that are filled with resin and from which the resin is drawn into the chamber by capillary forces. The resin 48 is shown to have flowed between the upper window 50 and the lower window 52, except where exposed to UV radiation. The result is the formation of compartments 42 and channels 44. The viscous nature of the resin and surface tension could be expected to produce a flow such that the walls of the compartments and chambers are convex, thus restricting the size of the open area of the channels and compartments and producing an insufficient fluid flow path. However, the channels and compartments have concave walls thus providing a desirable tubular passageway configuration.

In the manufacture of a chamber for the transport or separation of minute particles, such as biological cells, the extremely small dimensions involved create unique problems in the manufacture of equipment components. All of the components of the chamber are electrical insulators, and therefore, metal traces can be used to connect electrodes inside the compartments with the outside of the chamber. The electrodes are built into the chamber 12. Thin and/or thick conductive traces and electrodes can be deposited on either or both windows by a metal deposition technique, as well known in the art.

In another embodiment, the mask is not in close proximity to the chamber. Instead, a projection system is used. In this case, the mask is larger than the area to be shielded and is optically reduced by means of the projection process. The larger sized mask is easier to manufacture and, therefore, is less expensive than the mask which is equal in size to the region to be shielded from the curing radiation.

In another embodiment, a scanned laser beam is used to create the illumination field. The scanner laser is capable of generating 600 lines in one thirtieth of a second, which is significantly faster than the flow rate of the radiation curable polymer. In this case, as mask is not required and the chamber pattern can be quickly and economical modified, as required from time to time, by modifying the computer program which controls the scanner. The software directly converts the output of a CAD program into a scanner control file. The configuration of the new or modified chamber would be created or edited by means of a standard CAD program, the output of which would be immediately converted and sent to the laser scanner to produce a chamber with the desire configuration. Consequently, chambers with new configurations are produced within minutes of completion of the new design.

It is critical that premature curing of the resin in non-illuminated areas be prevented. Such premature illumination can result from the scattering of light by the cured edges. The premature curing can result in a premature slowing or stopping of the resin flow. The premature curing can be eliminated through the use of one or more of the following:

a) a strongly radiation absorbing resin can be used;
b) strong radiation absorbers can be added to the resin;
c) a large number of injection ports can be used to as to restrict the resin flow to short distances;
d) scanned laser beam illumination of each scanned segment can be stopped as soon as curing is sufficiently advanced, thus reducing the total amount of light scattered during the manufacturing of the chamber.

The flow of resin can be limited to the inside of the chamber in a number of different ways. In one embodiment, the open sides of the chamber are sealed with a high viscosity, fast curing epoxy resin. A UV curable epoxy can, advantageously, be used.

In another embodiment, the mask is provided with a pair of spaced slits, along opposite edges of the mask. The slits create a narrow, high intensity illumination field around the chamber which stops the outward flow of the resin.

In a further embodiment, electrodes are built into the chamber 12. Thin and/or thick conductive traces and electrodes can be deposited on either or both windows by a metal deposition technique, as well known in the art.

The process of the instant invention eliminates the need for a preformed central layer and the gluing step which is required in a three layer configuration. The manufacture of the mask 22, is similar in complexity to the manufacture of the ceramic or metal central layer of U.S. Pat. No. 5,100,627. However, a single mask is used to produce large numbers of manipulation chambers and therefore, results in a low, per unit cost, due to the amortization of the cost of the manufacture of the mask over a large number of manipulation chambers. The amount of resin used in the instant invention is extremely small, and is not a significant cost factor. The step, in the instant invention, of injecting resin between the inner and outer windows, is similar in duration to step in the prior art process, of applying an adhesive between the central core member and each of the two windows. Thus, the process of the instant invention results in overall cost savings, without a sacrifice in reliability or speed of manufacture.

What is claimed is:

1. The method of manufacture of an optical manipulation chamber, the optical manipulation chamber having a pair of spaced substrate members, at least one substrate member being transparent to polymerizing radiation and a central core member between said pair of spaced substrate members, said substrate members lying in essentially parallel planes and said central core member containing a plurality of compartments and channels, comprising the steps of;
   a) placing a radiation mask between one of said substrate members and a source of polymerizing radiation, said substrate member being essentially transparent to polymerization radiation, said mask having radiation shielding regions and non-shielding regions, said non-shielding regions being in a pattern corresponding to the pattern of said plurality of compartments and channels,
   b) pumping a radiation curable resin into the space between said pair of spaced substrate members,
   c) applying radiation from said source of polymerizing radiation to said radiation curable resin while it is being pumped into the space between said pair of spaced substrate members, thereby causing said radiation curable resin to at least partially cure and to prevent uncured resin from being pumped into said non-shielded regions, and
   d) exposing all of said radiation curable resin to said source of polymerization radiation until all of said radiation curable resin is cured.

2. The method of claim 1, wherein said radiation mask is removed from its position between said one of said substrate members and said source of polymerizing radiation, prior to the step of exposing all of the radiation curable resin to said polymerizing radiation until all of the radiation curable resin is cured.

3. The method of claim 1, wherein said radiation curable resin is pumped into the space between said two substrate members through a plurality of ports in one of said substrate members.

4. The method of claim 1, wherein said polymerization radiation is UV radiation.

5. The method of claim 1, wherein said radiation mask is spaced from said one of said substrate members.

6. The method of claim 5, wherein the unshielded area is optically reduced.

7. The method of claim 1, wherein said resin is strongly radiation absorbing resin.

8. The method of claim 1, wherein said resin further includes radiation absorber.

9. The method of claim 1, wherein said radiation is produced by a scanned laser beam.

10. The method of claim 9, wherein the scanning rate of said scanning laser is greater than the flow rate of said radiation curable resin.

11. The method of claim 9, wherein the illumination of each scanned segment is stopped as soon as curing is sufficiently advanced, and the total amount of light scattered during the manufacturing of the chamber is reduced.

12. The method of claim 1, wherein the flow of resin is limited to the inside of the chamber.

13. The method of manufacture of chambers in a three layer device having a pair of spaced substrate members and a central core member between said pair of substrate members, said substrate members lying in substantially parallel planes, comprising the steps of;
   a) flowing a radiation curable resin into the space between said pair of substrate members,
   b) applying radiation from a source of radiation to predetermined regions of said radiation curable resin while said radiation curable resin is being pumped into the space between said pair of substrate members, thereby causing said predetermined regions of radiation curable resin to at least partially cure and to prevent uncured resin from flowing past said at least partially cured regions, and
   c) exposing all of said radiation curable resin to said source of radiation until all of said radiation curable resin is cured.

14. The method of claim 13, wherein said predetermine regions form at least one enclosed chamber free of radiation curable resin.

15. The method of claim 14, wherein said chamber is an elongated channel free of radiation curable resin and wherein the surface tension between said radiation curable resin and said substrate members causes said enclosed channel to have concave side walls.

16. The method of claim 14, wherein said radiation is laser radiation.

17. The method of claim 15, wherein said radiation is produced by a scanning laser.

18. The method of claim 13, wherein predetermined regions form enclosed zones, and wherein said scanning laser irradiates said predetermined regions of radiation curable resin before uncured resin can flow into said enclosed zones, thereby forming enclosed zones which are free of radiation curable resin.

19. The method of manufacture of a structural device having a pair of spaced members, a central core member between said pair of spaced members, and at least one included resin free zone in said core member, at least one of said pair of spaced members being radiation transparent, comprising the steps of;
   a) delivering a radiation curable resin into the space between said pair of spaced members,
   b) applying radiation to at least one predetermined region of said radiation curable resin while it is being delivered into the space between said pair of spaced members, thereby causing said predetermined region of radiation curable resin to at least partially cure and to prevent uncured resin from being pumped past said at least partially cured region, and
   c) exposing all of the radiation curable resin to radiation until all of the radiation curable resin is cured, whereby a structural member is formed having at least one internal included resin free zone.

20. The method of claim 19, wherein said radiation is applied to predetermined regions of said radiation curable resin by shielding selected regions with a radiation impermeable mask, said mask being provided with at least a pair of spaced slits along opposite edges of said mask, whereby said slits create a narrow, high intensity illumination field around the chamber which stops the outward flow of the resin.

21. The method of claim 19, wherein said radiation curable resin is pumped to the space between said pair of spaced members.

22. The method of claim 21, wherein wherein the surface tension between said radiation curable resin and said spaced members causes said resin free zone to have concave side walls.

23. The method of claim 22, wherein said resin free zone is an elongated channel free of radiation curable resin.

24. The method of claim 19, wherein said resin free zone has a diameter on the order of less than about one half millimeter.

25. The method of claim 23, wherein said concave walls of said elongated channel have a maximum spacing on the order of about 100 microns.

26. The method of claim 13, comprising the step of:
b) applying a laser beam from a scanning laser to predetermined regions of said radiation curable resin while said radiation curable resin is being delivered onto said support surface, irradiating said predetermined regions of radiation curable resin with said scanning laser at a rate which is greater than the flow rate of uncured resin into said enclosed zones, causing said predetermined regions of radiation curable resin to at least partially cure and to prevent uncured resin from being delivered past said at least partially cured regions, thereby forming enclosed zones which are free of radiation curable resin.

27. The method of claim 26, wherein said scanner laser scans at a rate of at least about 600 line per thirtieth of a second.

* * * * *